(12) United States Patent
Hackett

(10) Patent No.: US 10,586,171 B2
(45) Date of Patent: Mar. 10, 2020

(54) PARALLEL ENSEMBLE OF SUPPORT VECTOR MACHINES

(71) Applicant: International Business Machines Corporation, Armonk, NY (US)

(72) Inventor: Charles E. Hackett, Greenlawn, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 808 days.

(21) Appl. No.: 15/169,349

(22) Filed: May 31, 2016

(65) Prior Publication Data
US 2017/0344903 A1 Nov. 30, 2017

(51) Int. Cl.
*G06N 20/00* (2019.01)

(52) U.S. Cl.
CPC .................................... *G06N 20/00* (2019.01)

(58) Field of Classification Search
CPC combination set(s) only.
See application file for complete search history.

(56) References Cited

U.S. PATENT DOCUMENTS

| | | | |
|---|---|---|---|
| 7,406,450 B2 | 7/2008 | Graf et al. | |
| 7,475,047 B1 | 1/2009 | Urmanov et al. | |
| 7,519,563 B1 | 4/2009 | Urmanov et al. | |
| 7,912,698 B2 * | 3/2011 | Statnikov | G16B 40/00 |
| | | | 704/8 |
| 8,135,652 B2 | 3/2012 | Graf et al. | |
| 8,160,975 B2 | 4/2012 | Tang et al. | |
| 8,306,942 B2 | 11/2012 | Chen et al. | |
| 9,037,519 B2 | 5/2015 | Han et al. | |
| 9,342,370 B2 * | 5/2016 | Cox | G06F 9/4856 |
| 9,619,881 B2 * | 4/2017 | Maddah | G06T 7/0016 |
| 2007/0122347 A1 * | 5/2007 | Statnikov | G16B 40/00 |
| | | | 424/9.341 |
| 2010/0177956 A1 * | 7/2010 | Cooper | G06K 9/00664 |
| | | | 382/159 |
| 2013/0326028 A1 * | 12/2013 | Cox | G06F 9/4856 |
| | | | 709/220 |
| 2015/0032674 A1 | 1/2015 | Cichosz et al. | |
| 2015/0087240 A1 * | 3/2015 | Loewke | G06T 7/0016 |
| | | | 455/67.11 |

(Continued)

OTHER PUBLICATIONS

Supervised Clustering with Support Vector Machines Thomas Finley Thorsten Joachims Appearing in Proceedings of the 22 nd International Conference on Machine Learning, Bonn, Germany, 2005 pgts. 1-8.*

(Continued)

*Primary Examiner* — Michael B Holmes
(74) *Attorney, Agent, or Firm* — Cantor Colburn LLP; William Kinnaman

(57) ABSTRACT

Systems, methods, and computer-readable media for building ensemble members of a Support Vector Machine (SVM) ensemble in parallel and executing processing in parallel on data allocated to each ensemble member are disclosed. The parallel construction and processing of data of each ensemble member allows a single large SVM calculation to be replaced with many smaller SVM calculations performed in parallel, and thus, may reduce the computational resources required to classify datasets.

20 Claims, 8 Drawing Sheets

(56) References Cited

U.S. PATENT DOCUMENTS

| | | | | |
|---|---|---|---|---|
| 2016/0321709 | A1* | 11/2016 | Reichert | G06Q 30/0242 |
| 2016/0328837 | A1 | 11/2016 | He et al. | |
| 2017/0344903 | A1* | 11/2017 | Hackett | G06N 20/00 |
| 2019/0163512 | A1* | 5/2019 | Hackett | G06F 9/45558 |
| 2019/0188375 | A1 | 6/2019 | Permeh et al. | |

OTHER PUBLICATIONS

Imbalanced classification using support vector machine ensemble Jiang Tian • Hong Gu • Wenqi Liu Neural Computing and Applications Mar. 2011, vol. 20, Issue 2, pp. 203-209.*

Support Vector Machine Classification Based on Fuzzy Clustering for Large Data Sets Jair Cervantes, Xiaoou Li, andWen Yu pp. 572-583 2006.*

A support vector machine-based ensemble algorithm for pitting corrosion modeling of EN 1.4404 stainless steel in sodium chloride solutions María Jesús Jiménez-Co me MaríadelaLuzMartín Victoria Matres Aug. 24, 2018 pp. 1-19.*

Elsevier, Pattern Recognition, Constructing support vector machine ensemble, Pattern Recognition 36 (2003) 2757-2767 Hyun-Chul Kim, Shaoning Pang, Hong-Mo Je, Daijin Kim*, Sung Yang Bang.*

Abawajy, Jemal, et al., "Iterative Construction of Hierarchical Classifiers for Phishing Website Detection," Journal of Networks, vol. 9, No. 8, 2014, pp. 2089-2098.

Abe, Shigeo, and Takuya Inoue. "Fast training of support vector machines by extracting boundary data." Artificial Neural Networks—ICANN 2001. Springer Berlin Heidelberg, 2001, pp. 308-313.

Blau, Gérard. "Analysis of a random forests model." The Journal of Machine Learning Research 13.1(2012): pp. 1063-1095.

Breiman, Leo. "Random forests." Machine learning 45.1 (2001): pp. 5-32.

Fernández-Delgado, Manuel, et al. "Do we need hundreds of classifiers to solve real world classificationproblems?." The Journal of Machine Learning Research 15.1 (2014): pp. 3133-3181.

Govada, Aruna, et al., "A Novel Approach to Distributed Multi-Class SVM," Transactions on Machine Learning and Artificial Intelligence, vol. 2, No. 5, 2014, pp. 72-79.

Ho, Tin Kam. "The random subspace method for constructing decision forests." Pattern Analysis and Machine Intelligence, IEEE Transactions on 20.8 (1998): pp. 832-844.

Kim, Hyun-Chul, et al. "Support vector machine ensemble with bagging." Pattern recognition with supportvector machines. Springer Berlin Heidelberg, 2002, pp. 397-408.

Li, Xiaoye, et al., "Weighted Random Subspace Method for High Dimensional Data Classification," Statistics and its Interface, vol. 2, No. 2, 2009, pp. 153-159.

Nandan, Manu, Pramod P. Khargonekar, and Sachin S. Talathi. "Fast SVM training using approximateextreme points." The Journal of Machine Learning Research 15.1 (2014): pp. 59-98.

Platt, John C., Nello Cristianini, and John Shawe-Taylor, "Large Margin DAGs for MulticlassClassification." nips. vol. 12. 1999 (7 pages).

Tanha, J., "Ensemble Approaches to Semi-Supervised Learning," PhD Thesis, downloaded from UvA-DARE, the Institutional repository of the University of Amsterdam (UvA), 2013, 156 pages.

Tao, Dacheng; et al. (2006). Asymmetric bagging and random subspace for support vector machines-based relevance feedback in image retrieval. IEEE Transactions on Pattern Analysis and Machine Intelligence 28 (7), pp. 1088-1099.

Tyree, Stephen, et al. "Parallel Support Vector Machines in Practice." arXiv preprint arXiv: pp. 1404.1066(2014).

Valentini, Giorgio, and Thomas G. Dietterich. "Bias-variance analysis of support vector machines for thedevelopment of SVM-based ensemble methods." The Journal of Machine Learning Research 5 (2004): pp. 725-775.

Wang, Shi-jin, et al. "Empirical analysis of support vector machine ensemble classifiers." Expert Systemswith Applications 36.3 (2009): pp. 6466-6476.

Yu, Hwanjo, Jiong Yang, and Jiawei Han. "Classifying large data sets using SVMs with hierarchicalclusters." Proceedings of the ninth ACM SIGKDD international conference on Knowledge discovery anddata mining. ACM, 2003 (10 pages).

Zhao, H. X., and Frédéric Magoules. "Parallel support vector machines on multi-core and multiprocessorsystems." 11th International Conference on Artificial Intelligence and Applications (AIA 2011). IASTED,2011, (8 pages).

Zhu, Kaihua, et al. "Parallelizing support vector machines on distributed computers." Advances in NeuralInformation Processing Systems. 2008 (8 pages).

* cited by examiner

PARALLEL ENSEMBLE OF SUPPORT VECTOR MACHINES

BACKGROUND

Machine learning (ML) is utilized in a variety of data analysis tasks such as classification, regression analysis, clustering, and so forth. ML algorithms are trained by processing example training data to identify a set of parameters required to learn a particular function.

Data classification is typically a supervised learning process. Supervised learning algorithms are trained by signaling the correct output for each observation in a set of training data. In other words, the training data is labeled. The labeled training data enables a supervised learning algorithm to adjust its internal parameters to reduce training error. After the training error has been reduced below a predetermined threshold, the supervised training algorithm can be tested by processing observations from a set of test data that the algorithm has not yet seen during training. The algorithm predicts a classification value on each observation in the test set. The predicted classification value is then compared to an actual correct value. If the deviation between the predicted classification value and the actual correct value (the test error) is within acceptable bounds, the algorithm can be used as a predictor of production data and can be, for example, embedded in a user application. A variety of types of ML classification algorithms are known. Applicability of a specific classification algorithm to a dataset may depend on the content of the dataset. Generally, no single classification algorithm will yield the best performance in all situations against all datasets.

A support vector machine (SVM) is a supervised learning model and associated algorithm that typically performs well for a variety of types of classification tasks. More specifically, an SVM is a supervised learning model that executes an associated learning algorithm on training input data to generate outputs that can then be used to classify new input data. In particular, given a set of training examples, each labeled as belonging to one of two or more categories, an SVM training algorithm constructs a model that assigns new examples into one category or the other. More formally, an SVM is a discriminative classifier defined by a separating hyperplane. The model constructed by the SVM training algorithm is an optimal hyperplane capable of categorizing new examples.

While an SVM is a robust classification algorithm, it can suffer from performance degradation in the form of increased computation time, for example, as the size of an input dataset increases. Large problems can demand computational resources that exceed a single processor's ability to provide a sufficient amount of memory and processing capacity. Even with a sufficiently sized computing platform, the elapsed wall clock time can be quite large. In such situations, use of a SVM can be prohibitive. Discussed herein are technical solutions that address at least of the aforementioned drawbacks associated with conventional SVMs as well as other drawbacks.

SUMMARY

In one or more example embodiments of the disclosure, a method for scheduling execution of parallel or distributed applications is disclosed that includes determining a subset of data in a training dataset to allocate to an ensemble member of the SVM ensemble; and building the ensemble member. Building the ensemble member includes partitioning a first portion of the subset of data into a first classification and a second portion of the subset of data into a second classification; determining a first plurality of data clusters among the first portion of the subset of data partitioned into the first classification and a second plurality of data clusters among the second portion of the subset of data partitioned into the second classification; identifying a first cross-classification cluster matchup, wherein the first cross-classification cluster matchup comprises a first data cluster of the first plurality of data clusters and a second data cluster of the second plurality of data clusters; identifying a second cross-classification cluster matchup, wherein the second cross-classification cluster matchup comprises a third data cluster of the first plurality of data clusters and a fourth data cluster of the second plurality of data clusters; and determining a first SVM for the first cross-classification cluster matchup and a second SVM for the second cross-classification cluster matchup, wherein the first SVM and the second SVM are determined at least partially in parallel.

In one or more other example embodiments of the disclosure, a system for scheduling execution of parallel or distributed application is disclosed that includes at least one memory storing computer-executable instructions; and at least one processor configured to access the at least one memory and execute the computer-executable instructions to: determine a subset of data in a training dataset to allocate to an ensemble member of the SVM ensemble; and build the ensemble member. Building the ensemble member includes partitioning a first portion of the subset of data into a first classification and a second portion of the subset of data into a second classification; determining a first plurality of data clusters among the first portion of the subset of data partitioned into the first classification and a second plurality of data clusters among the second portion of the subset of data partitioned into the second classification; identifying a first cross-classification cluster matchup, wherein the first cross-classification cluster matchup comprises a first data cluster of the first plurality of data clusters and a second data cluster of the second plurality of data clusters; identifying a second cross-classification cluster matchup, wherein the second cross-classification cluster matchup comprises a third data cluster of the first plurality of data clusters and a fourth data cluster of the second plurality of data clusters; and determining a first SVM for the first cross-classification cluster matchup and a second SVM for the second cross-classification cluster matchup, wherein the first SVM and the second SVM are determined at least partially in parallel.

In one or more other example embodiments of the disclosure, a computer program product for scheduling execution of parallel or distributed applications is disclosed that comprises a non-transitory storage medium readable by a processing circuit, the storage medium storing instructions executable by the processing circuit to cause a method to be performed. The method includes determining a subset of data in a training dataset to allocate to an ensemble member of the SVM ensemble; and building the ensemble member. Building the ensemble member includes partitioning a first portion of the subset of data into a first classification and a second portion of the subset of data into a second classification; determining a first plurality of data clusters among the first portion of the subset of data partitioned into the first classification and a second plurality of data clusters among the second portion of the subset of data partitioned into the second classification; identifying a first cross-classification cluster matchup, wherein the first cross-classification cluster matchup comprises a first data cluster of the first plurality of data clusters and a second data cluster of the second plurality of data clusters; identifying a second cross-classification cluster matchup, wherein the second cross-classification cluster matchup comprises a third data cluster of the first plurality of data clusters and a fourth data cluster of the second plurality of data clusters; and determining a first SVM for the first cross-classification cluster matchup and a second SVM for the second cross-classification cluster matchup, wherein the first SVM and the second SVM are determined at least partially in parallel.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
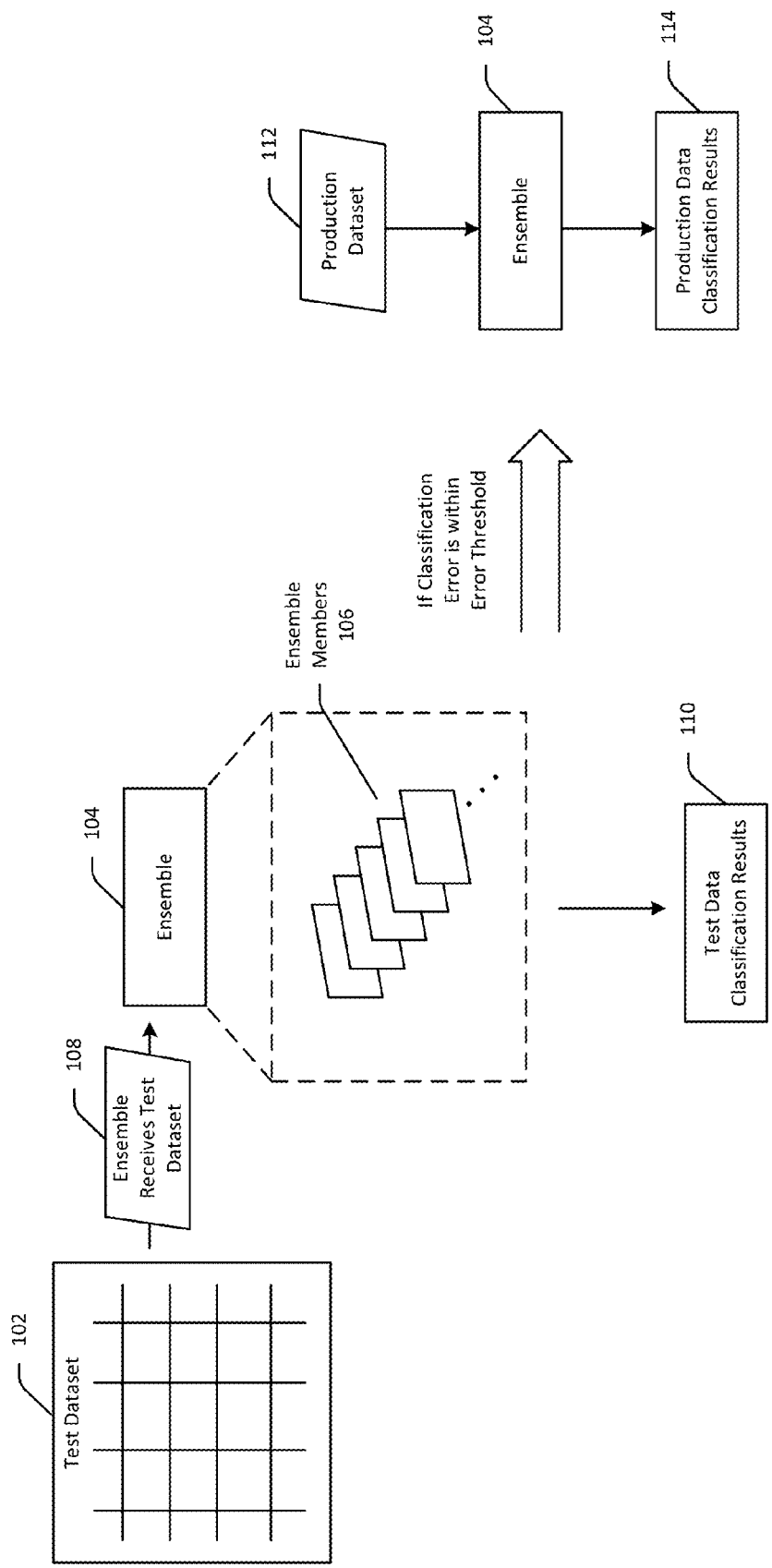
FIG. 1 is a schematic depiction of the use of test data to validate an ensemble that is generated in accordance with one or more example embodiments of the disclosure, and the use of the ensemble, if validated, to classify production data.

Example embodiments of the disclosure include, among other things, systems, methods, computer-readable media, techniques, and methodologies for replacing a single large SVM calculation with a plurality of smaller SVM calculations that can be performed in parallel. More specifically, an ensemble may be constructed from an initial dataset. The ensemble may include a plurality of voting members, and each ensemble member may be constructed independently of each other ensemble member, thereby allowing the ensemble members to be constructed in parallel. Each ensemble member may include a distinct combination of attributes from the overall initial dataset such that no two ensemble members analyze the same set of attributes. Initially, all observations may be included in an ensemble member, and the ensemble member may be subsequently filtered to remove observations that are poor SVM candidates. Example embodiments of the disclosure provide performance improvements (e.g., improvements to the functioning of a computer) over conventional SVMs in the form of faster computation time and reduced memory usage by allowing for parallel construction of ensemble members, parallel processing within each ensemble member, and data elimination within an ensemble member through filtering.

An SVM may operate on a dataset where each observation in the dataset is represented by a vector of values. Each value in a vector may relate to a corresponding attribute. The dataset may be organized or modeled in row and column format where each row represents an observation and each column represents an attribute. The objective of an SVM algorithm is to determine a set of vectors in the data (referred to as support vectors) that optimally define a separation boundary between classifications. During testing or production, an SVM uses these support vectors to determine the manner in which new input should be classified.

To determine the support vectors, an SVM algorithm develops an N×N matrix, where N is the number of observations in the dataset. Each entry in the matrix may be a pairwise combination of two observations in the dataset. As such, all entries in the matrix may represent all possible distinct pairwise combinations of observations in the dataset. As previously noted, each observation in a dataset may be a multi-dimensional vector of values. A kernel function may be used to form the pairwise combinations. Specifically, a kernel function may utilize all attributes of the two vectors in a pairwise combination to project the vectors into a higher dimensional space. The kernel function is most often an exponential function, but may take other forms as well such as a linear function.

When using a kernel function, the determination of each pairwise combination is computationally dependent on the number of attributes in the vectors. While the computational resources required for calculating an individual pairwise combination is small, the SVM calculation performance can degrade severely as the size of the data increases, with an upper bound of time complexity of $O(n^3)$ and an upper bound of space complexity of $O(n^2)$. Both the number of observations in the dataset (the number of rows of data) and the number of attributes (the number of columns of data) may contribute to the resource demands required to determine the support vectors.

Example embodiments of the disclosure address the performance degradation of conventional SVMs—particularly when operating on large datasets—by independently constructing ensemble members from a training dataset in parallel and executing a plurality of SVMs in each ensemble member in parallel. Further performance enhancements are achievable over conventional SVMs by performing various other types of parallel processing within each ensemble member, which will be described in more detail later in this disclosure.

Figure 6:
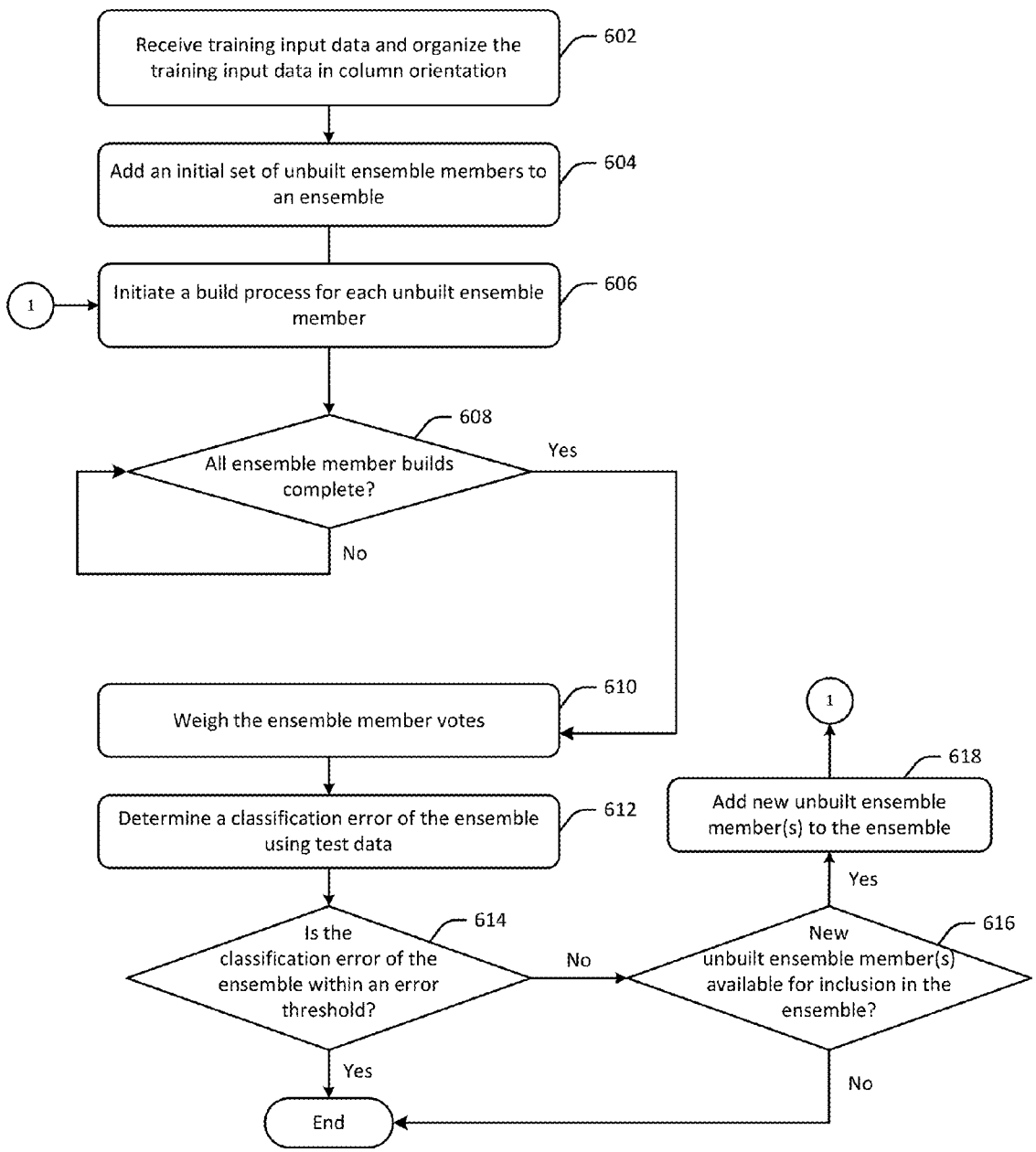
FIG. 6 is a process flow diagram of a method for building ensemble members of an ensemble using training data, applying weights to votes of the built ensemble members, and validating the ensemble using test data in accordance with one or more example embodiments of the disclosure.

FIG. 1 is a schematic depiction of the use of test data to validate an ensemble that is generated in accordance with one or more example embodiments of the disclosure, and the use of the ensemble, if validated, to classify production data. FIG. 6 is a process flow diagram of a method 600 for building ensemble members of an ensemble using training data, applying weights to votes of the built ensemble members, and validating the ensemble using test data in accordance with one or more example embodiments of the disclosure. FIGS. 1 and 6 will be described in conjunction with one another hereinafter. One or more operations of the method 600 may be performed by one or more engines, or more specifically, by one or more program modules or sub-modules forming part of such engine(s). A module, which may contain or be a collection of one or more sub-modules, may include computer-executable instructions that when executed by a processing circuit may cause one or more operations to be performed. A processing circuit may include one or more processing units or nodes. Computer-executable instructions may include computer-executable program code that when executed by a processing unit may cause input data contained in or referenced by the computer-executable program code to be accessed and processed to yield output data. Any module described herein may be implemented in any combination of software, hardware, and/or firmware. Depending on the implementation, any module described herein may form part of a larger collection of modules that together may constitute an engine, an application, or the like.

Referring first to FIG. 6, at block 602, computer-executable instructions of an ensemble build engine may be executed to receive training input data and organize the training input data in column orientation. The training input data may include a set of observations. Each observation may represent a multi-dimensional vector of values, and each value in a vector may correspond to a particular attribute. The number of observations may correspond to the number of rows in the training input data and the number of attributes may correspond to the number of columns in the training input data.

The training input data may be initially received in row orientation. Accordingly, at block 602, the ensemble build engine may re-organize the training input data into column orientation so that distinct sets of column data may be designated for use by different ensemble members as part of the ensemble member build process, which will be described in more detail later in this disclosure. At block 602, the ensemble build engine may also standardize the training input data. For example, each column may be standardized to a mean of zero and a standard deviation of one. Standardizing the training input data that is oriented in column orientation may improve the performance of the SVM algorithms that are executed on the data of each ensemble member.

Referring now to FIGS. 1 and 6, at block 604, the ensemble build engine may initialize an ensemble 104. Initializing the ensemble 104 may include adding an initial set of unbuilt ensemble members to the ensemble 104. The number of attributes (e.g., columns of data) contained in the training input data is known to the ensemble build engine. Further, the number of columns of data that will be processed by the members of the ensemble 104 may be specified (which may be all of the attributes or some subset thereof). Accordingly, at block 604, the ensemble build engine may determine the number of possible combinations of the data columns that have been specified for use by the ensemble members. The ensemble build engine may then select some initial number of ensemble members to be built, where each ensemble member is assigned a distinct combination of columns.

One or more ensemble member build modules (which may form part of the ensemble build engine) may then be executed to initiate, at block 606, a build process for each unbuilt ensemble member. Building an ensemble member may include a number of operations including classifying the data in the training dataset that is allocated to the ensemble member, identifying clusters in each classification, identifying cross-classification cluster matchups, filtering out certain vectors in each cluster matchup that are determined to be poor candidate support vectors, executing a respective SVM on the remaining vectors in each cluster matchup, and building a DAG using the respective SVM associated with each cluster matchup. These operations will be described in more detail later in this disclosure in reference to FIG. 7.

It should be appreciated that the build process performed for each ensemble member may be independent of the build process for each other ensemble member. Thus, multiple ensemble members may be built in parallel at block 606. The method 600 may not proceed further until the build process is completed for all ensemble members. Accordingly, the ensemble member build module(s) may periodically determine at block 608 whether all ensemble member builds have completed. In response to a negative determination at block 608, the determination may be made again at some periodic interval.

In response to a positive determination at block 608 indicating that all ensemble member builds are complete resulting in built ensemble members 106, the method 600 may proceed to block 610 where one or more weighting modules (which may form part of the ensemble build engine) may be executed to assign a respective weight to the classification vote of each ensemble member 106. The weight assigned to a particular ensemble member 106 may be used to adjust the impact of the ensemble member's classification determination on the overall classification determination of the ensemble 104 with respect to, for example, non-training data that may be classified using the ensemble 104. For example, ensemble members 106 that demonstrate high levels of classification error with respect to the training dataset may be weighted down, while ensemble members 106 that exhibit low classification error may be weighted up.

At block 612, one or more classification error determination modules (which may form part of the ensemble build engine) may be executed to determine an overall classification error of the ensemble 104 with respect to test data. More specifically, the ensemble 104 may receive 108 a test dataset 102 at block 612. The test dataset 102 may be in the same form as the training dataset, but may include data that was not used to train the ensemble 104, and thus, data that the ensemble 104 has not yet seen. The classification error determined at block 612 may be a metric that indicates the extent to which the classification results 110 predicted by the ensemble 104 match or deviate from the actual classifications for the collection of observations in the test dataset 102.

In certain example embodiments of the disclosure, the classification error associated with the ensemble 104 may be based at least in part on a class confusion matrix associated with the ensemble 104. For example, in certain example embodiments of the disclosure, one or more class confusion matrix determination modules (which may form part of the ensemble build engine) may be executed to determine a respective class confusion matrix for each ensemble member 106. The class confusion matrix for a particular ensemble member 106 may be calculated by passing each observation in the training dataset to the ensemble member 106, determining the classification predicted by the ensemble member 106, and comparing the predicted classification to the actual classification in the training dataset. Further, the class confusion matrix determination module(s) may be executed to determine an overall class confusion matrix for the ensemble 104. An overall majority or plurality vote of the ensemble 104 (e.g., the classification determined by a majority or plurality of ensemble members 106) may be used to determine the overall class confusion matrix for the ensemble 104. The overall class confusion matrix for the ensemble 104 may then be used to determine the respective weight to be applied to each ensemble member vote as well as the classification error of the ensemble 104.

At block 614, the classification error determination modules may be executed to determine whether the classification error is within an error threshold. The error threshold may be predetermined based on the desired classification accuracy for the ensemble 104. In response to a positive determination at block 614, the training of the ensemble 104 may be determined to be complete. That is, the ensemble 104 may be determined as having suitable accuracy to be used to classify a production dataset 112 to generate production data classification results 114.

On the other hand, in response to a negative determination at block 614 indicating that the classification error is not within the error threshold, the method 600 may proceed to block 616 where the ensemble build engine may determine whether it is possible to add new ensemble members to the ensemble 104. In response to a negative determination at block 616, the training of the ensemble 104 may be terminated because the error threshold has not been met and it has been determined that it is not possible to generate more ensemble members in an attempt to reduce the classification error of the ensemble 104. In such a scenario, the ensemble 104 may be deemed to lack the classification accuracy required to operate on the production dataset 112. A negative determination may be made at block 616 for any of a variety of reasons. For example, there may be a specified limit on the number of ensemble members 106 that the ensemble 104 may include, and the limit may have been reached. As another example, all possible combinations of data columns may have been exhausted (e.g., already assigned to existing ensemble members 106) such that no new ensemble members can be generated.

On the other hand, in response to a positive determination at block 616, the ensemble build engine may add one or more new unbuilt ensemble members to the ensemble 104 at block 618, and the method 600 may proceed iteratively from block 606 until the classification error of the ensemble 104 is within the error threshold or no new ensemble members can be added to the ensemble 104.

Figure 7:
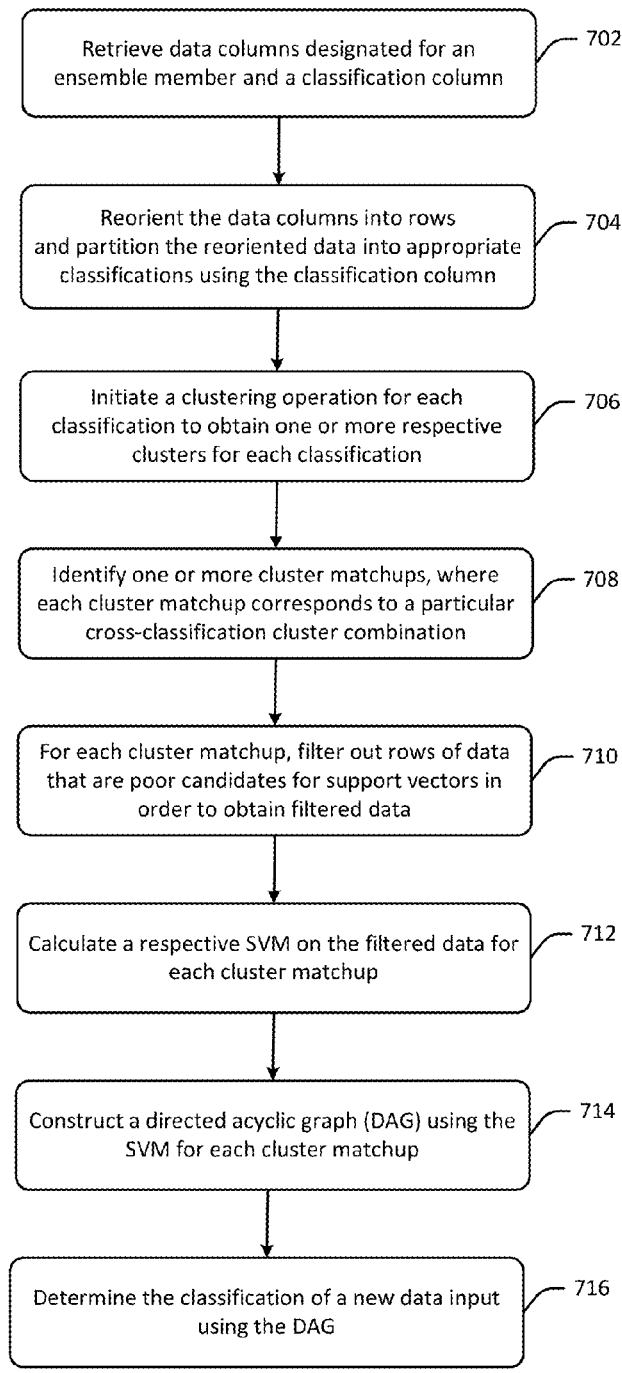
FIG. 7 is a process flow diagram of a detailed method for building an ensemble member in accordance with one or more example embodiments of the disclosure.

FIG. 7 is a process flow diagram of a detailed method 700 for building an ensemble member in accordance with one or more example embodiments of the disclosure. One or more operations of the method 700 may be performed by one or more sub-modules of the ensemble member build module(s). While the method 700 will be described with respect to a particular unbuilt ensemble member 208 of the ensemble 104 (which after the build process is completed, becomes one of the built ensemble members 106), it should be appreciated that the method 700 may be performed with respect to each unbuilt ensemble member of the ensemble 104 in parallel. FIG. 7 will be described at various points hereinafter in conjunction with FIGS. 2A-5.

Figure 2A:
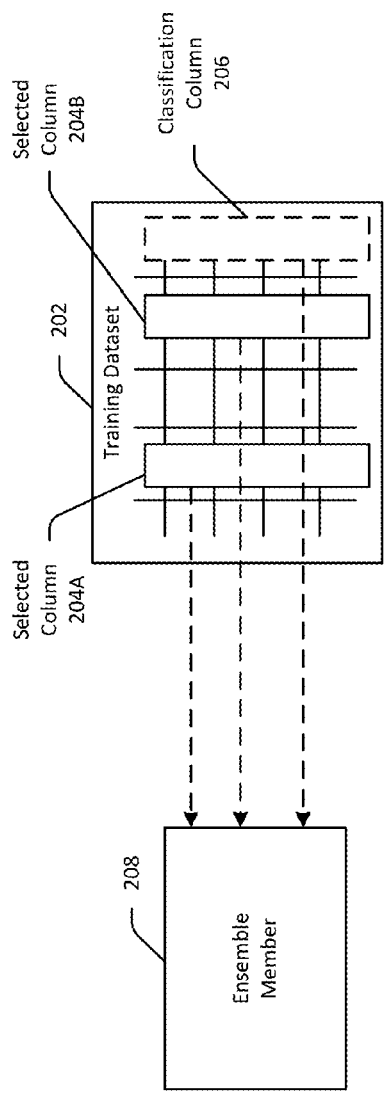
FIG. 2A is a schematic depiction of the designation of columns in a training dataset to an ensemble member and the retrieval of the designated data columns and a classification column as part of initiating a process for building the ensemble member in accordance with one or more example embodiments of the disclosure.

At block 702, one or more column data assignment/retrieval modules may be executed to retrieve 1) data columns designated for an unbuilt ensemble member 208 and 2) a classification column. An example training dataset 202 is shown in row and column format in FIG. 2A. The training dataset 202 may have initially been oriented in a row orientation and may have been reoriented to a column orientation as previously described. Two or more data columns representing a distinct combination of attributes in the training dataset 202 may be designated for the ensemble member 208 that is to be built. For example, data column 204A and data column 204B may be designated for processing by the ensemble member 208. Thus, at block 702, the column data assignment/retrieval module(s) may be executed to cause the ensemble member 208 to access a data store to retrieve the data columns (e.g., columns 204A, 204B) that have been assigned to the ensemble member 208 as well as a classification column 206 that indicates the actual classifications of observations corresponding to the assigned columns. While FIG. 2A illustratively depicts two data columns as being assigned to ensemble member 208, it should be appreciated that any number of two or more data columns may be designated for an ensemble member.

Example embodiments of the disclosure that subset the training dataset 202 by column for the purposes of assigning distinct combinations of data columns to different ensemble members are distinguishable, among other reasons, from SVM techniques that subset by row. It should be appreciated that while there may be some data column overlap across ensemble members, in certain example embodiments, no two ensemble members process the exact same combination of data columns. For example, while data column 204A and/or data column 204B may be assigned to another ensemble member other than ensemble member 208, no other ensemble member is assigned the same exact combination of data columns as ensemble member 208. In a shared memory parallel implementation, an appropriate mechanism may be employed to allow data sharing without having to copy a data column to each ensemble member to which it has been assigned.

Figure 2B:
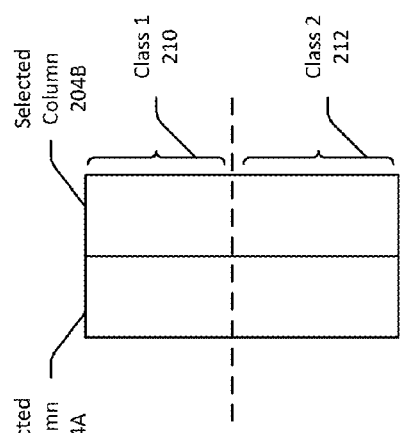
FIG. 2B is a schematic depiction of the classification of data within an ensemble member in accordance with one or more example embodiments of the disclosure.

At block 704, one or more partitioning modules may be executed to reorient the data columns into rows and partition the reoriented data into appropriate classifications. For example, as depicted in FIG. 2B, the data in the data columns 204A and 204B may be reoriented into row orientation and partitioned using the classification column 206 to classify each row as belonging to either Class 1 210 or Class 2 212, as depicted in FIG. 2B. While two classifications are illustratively depicted in FIG. 2B, it should be appreciated that an ensemble member may partition data into any number of two or more classifications.

Figure 3:
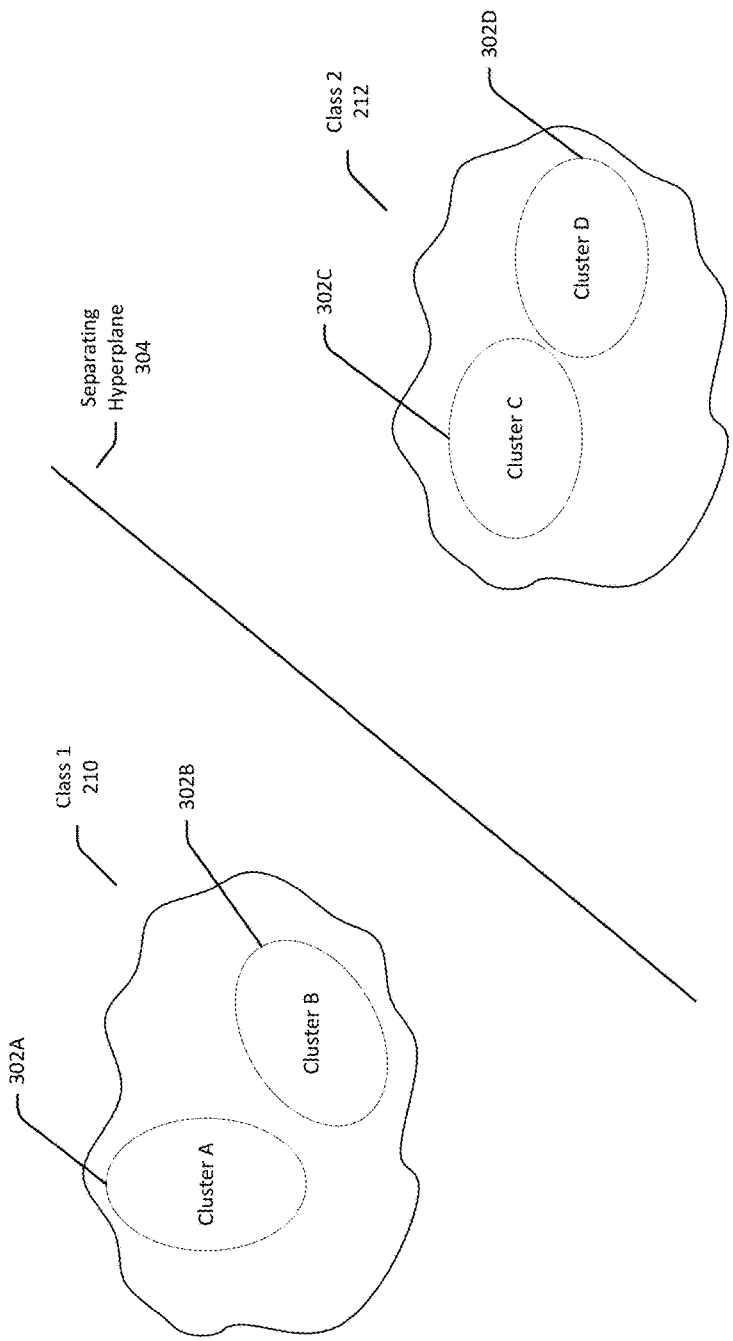
FIG. 3 is a schematic depiction of the identification of clusters within each classification in an ensemble member in accordance with one or more example embodiments of the disclosure.

At block 706, one or more clustering modules may be executed to initiate a clustering operation for each classification to obtain one or more respective clusters for each classification. Each cluster that is identified within a given classification may include row vectors of data that are similar to one another and may exclude dissimilar row vectors. The clustering operations provide an additional opportunity for parallel processing in that the classifications can be clustered independently of one another in parallel. For example, as shown in FIG. 3, Cluster A 302A and Cluster B 302B may be identified in Class 1 210 and Cluster C 302C and Cluster D 302D may be identified in Class 2 212. Class 1 210 and Class 2 212 are delineated from one another by a separating hyperplane 304. It should be appreciated that while only two clusters are depicted in each of Class 1 210 and Class 2 212, respectively, any number of clusters may be identified for each class.

The method 700 may proceed to block 708 upon completion of all parallel clustering operations. At block 708, one or more cluster matchup identification modules may be executed to identify one or more cluster matchups, where each cluster matchup corresponds to a particular cross-classification cluster combination. For example, for the example clusters depicted in FIG. 3, the cross-classification cluster matchups would include the following: (1A, 2C); (1A, 2D); (1B, 2C); and (1B; 2D). It should be appreciated that the number of cross-classification matchups that are identified is dependent on the number of clusters identified in each classification as well as the number of classifications. For instance, in an example implementation involving three classifications (Class 1, Class 2, and Class 3), where Clusters A and B are identified in Class 1, Clusters C and D are identified in Class 2, and Clusters E, F, and G are identified in Class 3, the cross-classification cluster matchups would include the following: (1A, 2C); (1A, 2D); (1B, 2C); (1B; 2D); (1A, 3E); (1A, 3F); (1A; 3G); (1B, 3E); (1B, 3F); (1B, 3G); (2C, 3E); (2C, 3F); (2C, 3G); (2D, 3E); (2D, 3F); and (2D, 3G).

Figure 4:
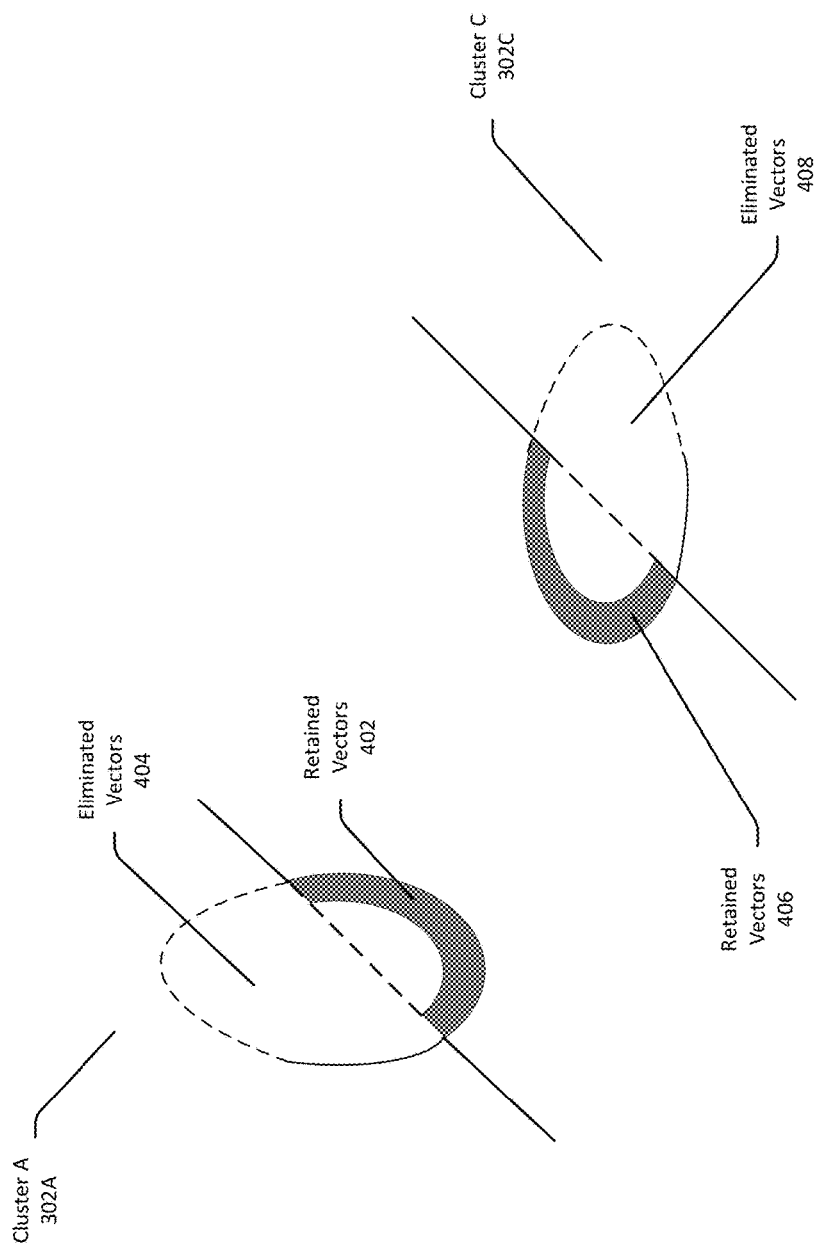
FIG. 4 is a schematic depiction of a filtering process applied to an example cluster matchup to eliminate vectors that are poor candidates for use as support vectors in accordance with one or more example embodiments of the disclosure.

At block 710, one or more filtering modules may be executed to filter out row vectors in each cluster matchup that are unlikely to be used as support vectors. FIG. 4 is a schematic depiction of the filtering process applied to an example cluster matchup (1A, 2C) to eliminate vectors that are poor candidates for use as support vectors in accordance with one or more example embodiments of the disclosure. As shown in FIG. 4, row vectors in each cluster that are located further away from the other cluster may be filtered out. As another example, interior row vectors in each cluster may be unlikely to be used as support vectors and may also be filtered out.

As a result of the filtering operations performed at block 710, a set of retained row vectors and a set of eliminated row vectors may be determined. For example, for Cluster A 302A in the cluster matchup (1A, 2C), the row vectors 404 located away from Cluster C 302C and the row vectors located towards the interior of Cluster A 302A may be eliminated, leaving retained row vectors 402. Similarly, for Cluster C 302C, the row vectors 406 located away from Cluster A 302A and the row vectors located towards the interior of Cluster C 302C may be eliminated, leaving retained row vectors 408. Row vector elimination may be subject to a maximum threshold to ensure that a minimum number of row vectors remain in each cluster so as to prevent the SVM executed for each cluster matchup from becoming trivial. In certain example embodiments, a convex analysis may be employed to determine which row vectors will be retained in each cluster of a cluster matchup.

At block 712, one or more SVM execution modules may be executed to calculate a respective SVM on the filtered data of each cluster matchup (e.g., the retained row vectors of each cluster in a cluster matchup). It should be appreciated that each cross-classification cluster matchup is independent of each other cross-classification cluster matchup because each cluster matchup corresponds to a distinct pair of cross-classification clusters, and thus, the set of cluster matchups can be processed in parallel. That is, the row vector filtering operations and the SVM calculation performed on the filtered data may be performed in parallel for each cluster matchup.

Figure 5:
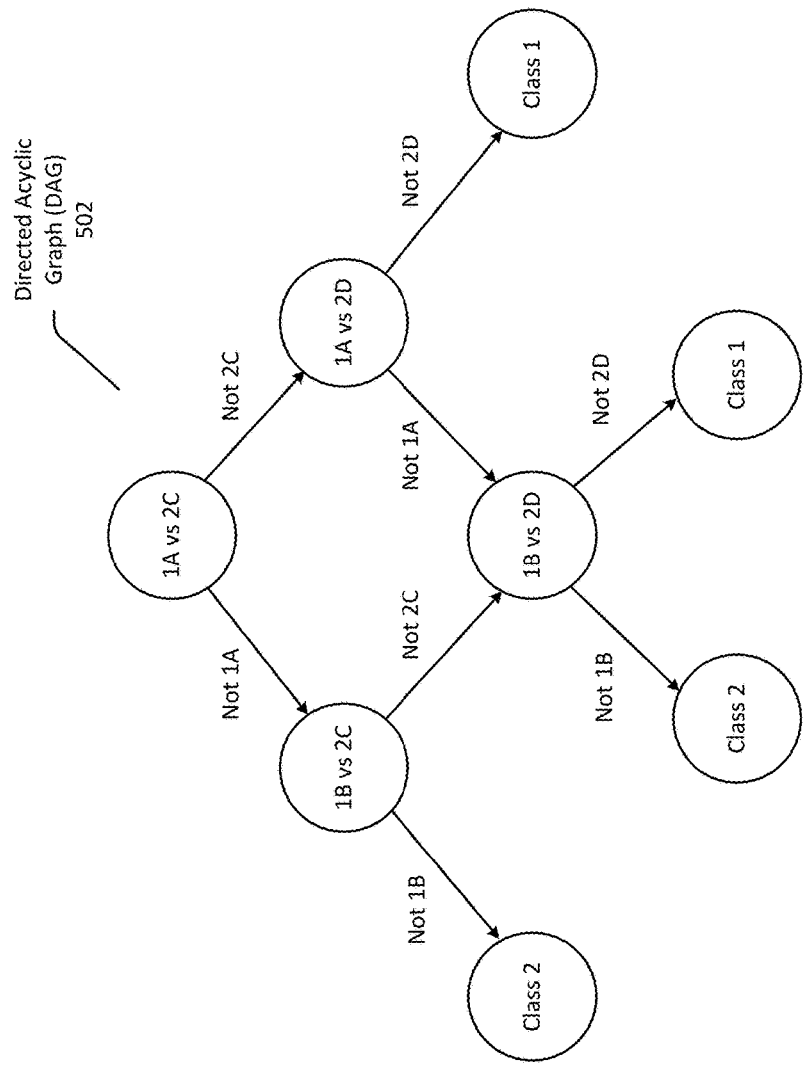
FIG. 5 depicts an example directed acyclic graph (DAG) in accordance with one or more example embodiments of the disclosure.

After corresponding SVMs have been calculated for all cluster matchups, one or more DAG generation modules may be executed at block 714 to construct a DAG using each SVM corresponding to each cluster matchup. FIG. 5 depicts an example DAG 502 in accordance with one or more example embodiments of the disclosure. The DAG 502 may be used to determine the classification chosen by the ensemble member for a new data input at block 716. The new data input may be, for example, an observation in the training dataset 202, an observation in the test dataset 102, or an observation in the production dataset 112. It should be appreciated that FIG. 5 depicts the DAG 502 constructed for an example scenario involving two possible classifications with two clusters identified in each classification. As the number of classifications and/or the number of clusters identified in a classification increase, the number of decision nodes in the DAG would increase.

Example embodiments of the disclosure include or yield various technical features, technical effects, and/or improvements to technology. For instance, example embodiments of the disclosure provide the technical effect of reducing the amount of data that an individual SVM must process. This technical effect is achieved as a result of the technical features of partitioning a dataset among different ensemble members (e.g., assigning different subsets of data columns to different ensemble members), clustering each classification within each ensemble member, and performing row filtering for each cluster matchup in an ensemble member to further reduce the amount of data processed by a respective SVM corresponding to each cluster matchup. The initial column reduction coupled with the row filtering yields the technical effect of reducing the size of the internal matrix that is processed by each SVM in an ensemble member. Example embodiments of the disclosure also provide the technical effect of parallel processing of a dataset. As previously described, multiple ensemble members may be constructed in parallel. In addition, within each ensemble member, operations to identify clusters in each classification as well as row filtering and SVM calculations for each cluster matchup may be performed in parallel. As a result of the reduction in the amount of data that each SVM is required to calculate as well as the capability to construct the ensemble members in parallel and calculate the SVMs corresponding to the cluster matchups in each ensemble member in parallel, example embodiments of the disclosure may require less computational resources (e.g., less memory resources and less processing time) than conventional SVMs, and thus, provide improvements to the functioning of a computer. If a sufficiently wide multi-processing capability is available, example embodiments of the disclosure may be able to reduce the overall elapsed processing time to a factor of the largest single SVM calculation. It should be appreciated that the above examples of technical features, technical effects, and improvements to the functioning of a computer and computer technology provided by example embodiments of the disclosure are merely illustrative and not exhaustive.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 8:
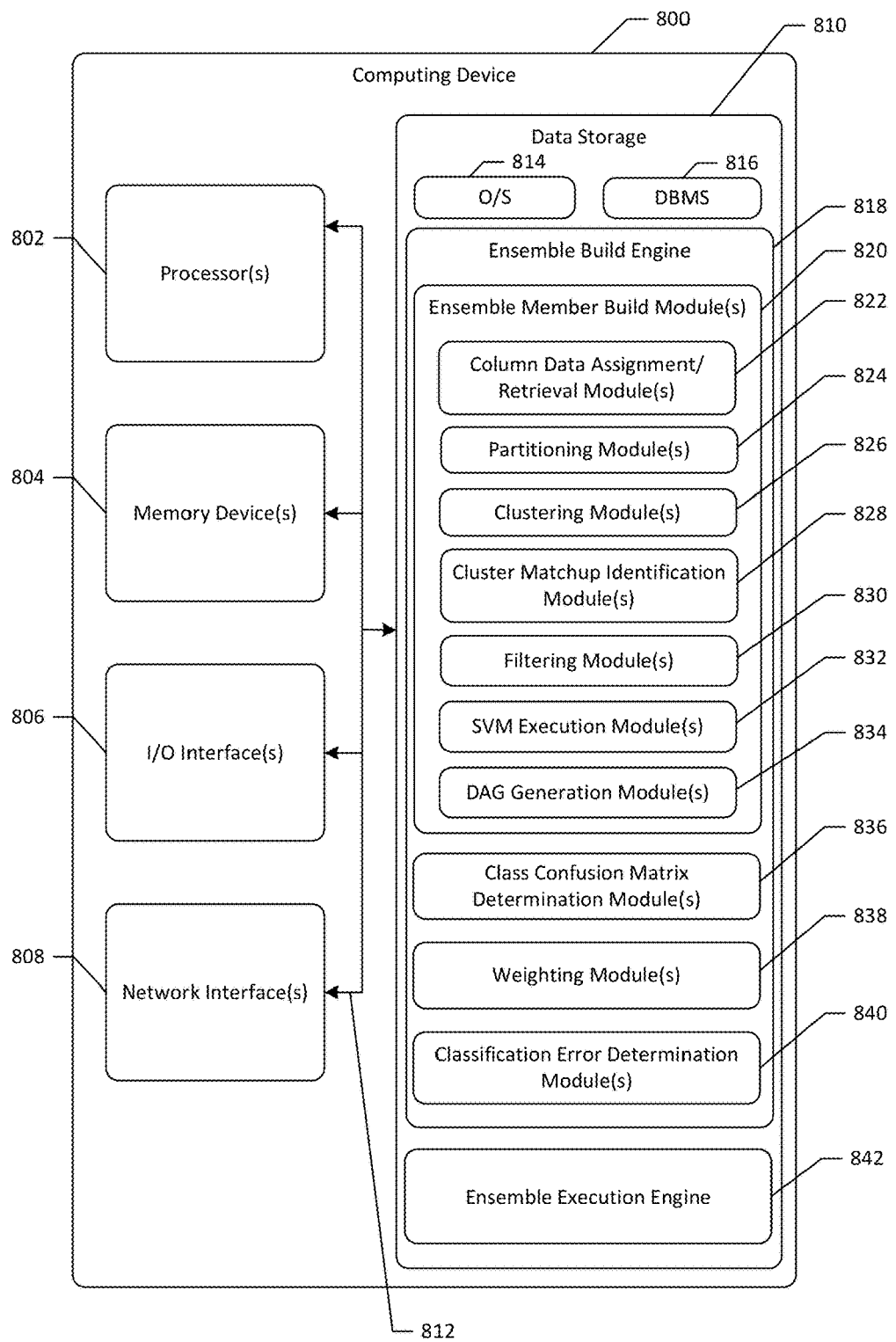
FIG. 8 is a schematic diagram of an illustrative computing device that is configured to generate and utilize an ensemble to classify production data in accordance with one or more example embodiments of the disclosure.

FIG. 8 is a schematic diagram of an illustrative computing device 800 that is configured to generate and utilize an ensemble to classify production data in accordance with one or more example embodiments of the disclosure. While the computing device 800 may be described herein in the singular, it should be appreciated that multiple instances of the computing device 800 may be provided, and functionality described in connection with the computing device 800 may be distributed across such multiple instances.

In an illustrative configuration, the computing device 800 may include one or more processors (processor(s)) 802, one or more memory devices 804 (generically referred to herein as memory 804), one or more input/output ("I/O") interface(s) 806, one or more network interfaces 808, and data storage 810. The computing device 800 may further include one or more buses 812 that functionally couple various components of the computing device 800.

The bus(es) 812 may include at least one of a system bus, a memory bus, an address bus, or a message bus, and may permit exchange of information (e.g., data (including computer-executable code), signaling, etc.) between various components of the computing device 800. The bus(es) 812 may include, without limitation, a memory bus or a memory controller, a peripheral bus, an accelerated graphics port, and so forth. The bus(es) 812 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 804 of the computing device 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 810 may include removable storage and/or non-removable storage including, but not limited to, magnetic storage, optical disk storage, and/or tape storage. The data storage 810 may provide non-volatile storage of computer-executable instructions and other data. The memory 804 and the data storage 810, removable and/or non-removable, are examples of computer-readable storage media (CRSM) as that term is used herein.

The data storage 810 may store computer-executable code, instructions, or the like that may be loadable into the memory 804 and executable by the processor(s) 802 to cause the processor(s) 802 to perform or initiate various operations. The data storage 810 may additionally store data that may be copied to memory 804 for use by the processor(s) 802 during the execution of the computer-executable instructions. Moreover, output data generated as a result of execution of the computer-executable instructions by the processor(s) 802 may be stored initially in memory 804 and may ultimately be copied to data storage 810 for non-volatile storage.

More specifically, the data storage 810 may store one or more operating systems (O/S) 814; one or more database management systems (DBMS) 816 configured to access the memory 804 and/or one or more external data stores (not shown); and one or more program modules, applications, engines, computer-executable code, scripts, or the like such as, for example, an ensemble build engine 818 and an ensemble execution engine 842. The ensemble build engine 818 may include one or more ensemble member build modules 820, which in turn, may include one or more sub-modules such as, for example, one or more column data assignment/retrieval modules 822, one or more partitioning modules 824, one or more clustering modules 826, one or more cluster matchup identification modules 828, one or more filtering modules 830, one or more SVM execution modules 832, and one or more DAG generation modules 834. The ensemble build engine 818 may further include one or more class confusion matrix determination modules 836, one or more weighting modules 838, and one or more classification error determination modules 840. Any of the components depicted as being stored in data storage 810 may include any combination of software, firmware, and/or hardware. The software and/or firmware may include computer-executable instructions (e.g., computer-executable program code) that may be loaded into the memory 804 for execution by one or more of the processor(s) 802 to perform any of the operations described earlier in connection with correspondingly named modules.

Although not depicted in FIG. 8, the data storage 810 may further store various types of data utilized by components of the computing device 800 (e.g., the training dataset 202, the test dataset 102, the production dataset 112, etc.). Any data stored in the data storage 810 may be loaded into the memory 804 for use by the processor(s) 802 in executing computer-executable instructions. In addition, any data stored in the data storage 810 may potentially be stored in one or more external data store and may be accessed via the DBMS 816 and loaded in the memory 804 for use by the processor(s) 802 in executing computer-executable instructions.

The processor(s) 802 may be configured to access the memory 804 and execute computer-executable instructions loaded therein. For example, the processor(s) 802 may be configured to execute computer-executable instructions of the various program modules, applications, engines, or the like of the computing device 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 810, the O/S 814 may be loaded from the data storage 810 into the memory 804 and may provide an interface between other application software executing on the computing device 800 and hardware resources of the computing device 800. More specifically, the O/S 814 may include a set of computer-executable instructions for managing hardware resources of the computing device 800 and for providing common services to other application programs (e.g., managing memory allocation among various application programs). In certain example embodiments, the O/S 814 may control execution of one or more of the program modules depicted as being stored in the data storage 810. The O/S 814 may include any operating system now known or which may be developed in the future including, but not limited to, any server operating system, any mainframe operating system, or any other proprietary or non-proprietary operating system.

The DBMS 816 may be loaded into the memory 804 and may support functionality for accessing, retrieving, storing, and/or manipulating data stored in the memory 804, data stored in the data storage 810, and/or data stored in external data store(s) (not shown). The DBMS 816 may use any of a variety of database models (e.g., relational model, object model, etc.) and may support any of a variety of query languages. The DBMS 816 may access data represented in one or more data schemas and stored in any suitable data repository. External data store(s) (not shown) that may be accessible by the computing device 800 via the DBMS 816 may include, but are not limited to, databases (e.g., relational, object-oriented, etc.), file systems, flat files, distributed datastores in which data is stored on more than one node of a computer network, peer-to-peer network datastores, or the like. The data store(s) may store various types of data including, without limitation, the training dataset 202, the test dataset 102, the product dataset 112, classification results, etc. It should be appreciated that, in certain example embodiments, any external data store and/or any of the data residing thereon may additionally, or alternatively, be stored locally in the data storage 810.

Referring now to other illustrative components of the computing device 800, the input/output (I/O) interface(s) 806 may facilitate the receipt of input information by the computing device 800 from one or more I/O devices as well as the output of information from the computing device 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 800 may further include one or more network interfaces 808 via which the computing device 800 may communicate with any of a variety of other systems, platforms, networks, devices, and so forth. The network interface(s) 808 may enable communication, for example, with one or more other devices via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the engines and program modules depicted in FIG. 8 as being stored in the data storage 810 are merely illustrative and not exhaustive and that processing described as being supported by any particular engine or module may alternatively be distributed across multiple engines, modules, or the like, or performed by a different engine, module, or the like. In addition, various program module(s), script(s), plug-in(s), Application Programming Interface(s) (API(s)), or any other suitable computer-executable code hosted locally on the computing device 800 and/or hosted on other computing device(s) accessible via one or more networks, may be provided to support functionality provided by the engines or modules depicted in FIG. 8 and/or additional or alternate functionality. Further, functionality may be modularized differently such that processing described as being supported collectively by a collection of modules depicted in FIG. 8 may be performed by a fewer or greater number of program modules, or functionality described as being supported by any particular module may be supported, at least in part, by another program module. In addition, engines or program modules that support the functionality described herein may form part of one or more applications executable across any number of computing devices 800 in accordance with any suitable computing model such as, for example, a client-server model, a peer-to-peer model, and so forth. In addition, any of the functionality described as being supported by any of the engines or program modules depicted in FIG. 8 may be implemented, at least partially, in hardware and/or firmware across any number of devices.

It should further be appreciated that the computing device 800 may include alternate and/or additional hardware, software, or firmware components beyond those described or depicted without departing from the scope of the disclosure. More particularly, it should be appreciated that software, firmware, or hardware components depicted as forming part of the computing device 800 are merely illustrative and that some components may not be present or additional components may be provided in various embodiments. While various illustrative engines and program modules have been depicted and described as software modules stored in data storage 810, it should be appreciated that functionality described as being supported by the engines or modules may be enabled by any combination of hardware, software, and/or firmware. It should further be appreciated that each of the above-mentioned engines or modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular engine or module may, in various embodiments, be provided at least in part by one or more other engines or modules. Further, one or more depicted engines or modules may not be present in certain embodiments, while in other embodiments, additional engines or modules not depicted may be present and may support at least a portion of the described functionality and/or additional functionality. Moreover, while certain modules may be depicted or described as sub-modules of another module, in certain embodiments, such modules may be provided as independent modules or as sub-modules of other modules.

One or more operations of the methods 600-700 may be performed by a computing device 800 having the illustrative configuration depicted in FIG. 8, or more specifically, by one or more program modules, engines, applications, or the like executable on such a device. It should be appreciated, however, that such operations may be implemented in connection with numerous other device configurations.

The operations described and depicted in the illustrative methods of FIGS. 6-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 6-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for constructing a Support Vector Machine (SVM) ensemble, the method comprising:
    determining a subset of data in a training dataset to allocate to an ensemble member of the SVM ensemble; and
    building the ensemble member, wherein building the ensemble member comprises:
        partitioning a first portion of the subset of data into a first classification and a second portion of the subset of data into a second classification;
        determining a first plurality of data clusters among the first portion of the subset of data partitioned into the first classification and a second plurality of data clusters among the second portion of the subset of data partitioned into the second classification;
        identifying a first cross-classification cluster matchup, wherein the first cross-classification cluster matchup comprises a first data cluster of the first plurality of data clusters and a second data cluster of the second plurality of data clusters;
        identifying a second cross-classification cluster matchup, wherein the second cross-classification cluster matchup comprises a third data cluster of the first plurality of data clusters and a fourth data cluster of the second plurality of data clusters; and
        determining a first SVM for the first cross-classification cluster matchup and a second SVM for the second cross-classification cluster matchup,
        wherein the first SVM and the second SVM are determined at least partially in parallel.

2. The method of claim 1, wherein the training dataset is a first dataset, and wherein building the ensemble member further comprises:
    constructing a directed acyclic graph (DAG) using the first SVM and the second SVM,
    the method further comprising:
        classifying, by the ensemble member, a row vector of a second dataset in one of the first classification or the second classification using the DAG.

3. The method of claim 1, wherein the ensemble member is a first ensemble member and the subset of data in the training dataset is a first subset of data, the method further comprising:
    determining a second subset of data in the training dataset to allocate to a second ensemble member of the SVM ensemble; and
    building the second ensemble member, wherein building the second ensemble member comprises:
        partitioning a first portion of the second subset of data into the first classification and a second portion of the second subset of data into the second classification;
        determining a third plurality of data clusters among the first portion of the second subset of data partitioned into the first classification and a fourth plurality of data clusters among the second portion of the second subset of data partitioned into the second classification;
        identifying a third cross-classification cluster matchup, wherein the third cross-classification cluster matchup comprises a first data cluster of the third plurality of data clusters and a second data cluster of the fourth plurality of data clusters;

identifying a fourth cross-classification cluster matchup, wherein the fourth cross-classification cluster matchup comprises a third data cluster of the third plurality of data clusters and a fourth data cluster of the fourth plurality of data clusters; and determining a third SVM for the third cross-classification cluster matchup and a fourth SVM for the fourth cross-classification cluster matchup, wherein the third SVM and the fourth SVM are determined at least partially in parallel.

4. The method of claim 3, wherein the first SVM, the second SVM, the third SVM, and the fourth SVM are each determined at least partially in parallel.

5. The method of claim 3, wherein the SVM ensemble comprises a plurality of ensemble members including the first ensemble member and the second ensemble member, the method further comprising:

determining a first class confusion matrix for the first ensemble member;

determining a second class confusion matrix for the second ensemble member; and determining an overall class confusion matrix for the SVM ensemble based at least in part on a set of classification results determined by the SVM ensemble for the training dataset, wherein each classification result is a classification determined by a threshold number of the plurality of ensemble members for a respective observation in the training dataset.

6. The method of claim 5, further comprising:

determining, based at least in part on the first class confusion matrix and the second class confusion matrix, that a first classification error associated with the first ensemble member is greater than a second classification error associated with the second ensemble member;

assigning a first weight to the first ensemble member based at least in part on the first class confusion matrix; and assigning a second weight to the second ensemble member based at least in part on the second class confusion matrix, wherein the first weight is less than the second weight.

7. The method of claim 1, wherein building the ensemble member further comprises:

filtering the first cross-classification cluster matchup to remove a first one or more row vectors that are not candidates for use as a support vector for the first SVM; and filtering the second cross-classification cluster matchup to remove a second one or more row vectors that are not candidates for use as a support vector for the second SVM, wherein the first cross-classification cluster matchup and the second cross-classification cluster matchup are filtered at least partially in parallel.

8. A system for constructing a Support Vector Machine (SVM) ensemble, the system comprising:

at least one memory storing computer-executable instructions; and at least one processor configured to access the at least one memory and execute the computer-executable instructions to:

determine a subset of data in a training dataset to allocate to an ensemble member of the SVM ensemble; and perform a build of the ensemble member by:

partitioning a first portion of the subset of data into a first classification and a second portion of the subset of data into a second classification;

determining a first plurality of data clusters among the first portion of the subset of data partitioned into the first classification and a second plurality of data clusters among the second portion of the subset of data partitioned into the second classification;

identifying a first cross-classification cluster matchup, wherein the first cross-classification cluster matchup comprises a first data cluster of the first plurality of data clusters and a second data cluster of the second plurality of data clusters;

identifying a second cross-classification cluster matchup, wherein the second cross-classification cluster matchup comprises a third data cluster of the first plurality of data clusters and a fourth data cluster of the second plurality of data clusters; and determining a first SVM for the first cross-classification cluster matchup and a second SVM for the second cross-classification cluster matchup, wherein the first SVM and the second SVM are determined at least partially in parallel.

9. The system of claim 8, wherein the training dataset is a first dataset, and wherein the at least one processor is further configured to perform the build of the ensemble member by executing the computer-executable instructions to:

construct a directed acyclic graph (DAG) using the first SVM and the second SVM, and wherein the at least one processor is further configured to execute the computer-executable instructions to:

classify a row vector of a second dataset in one of the first classification or the second classification using the DAG.

10. The system of claim 8, wherein the ensemble member is a first ensemble member and the subset of data in the training dataset is a first subset of data, and wherein the at least one processor is further configured to execute the computer-executable instructions to:

determine a second subset of data in the training dataset to allocate to a second ensemble member of the SVM ensemble; and perform a build of the second ensemble member by:

partitioning a first portion of the second subset of data into the first classification and a second portion of the second subset of data into the second classification;

determining a third plurality of data clusters associated with the first classification and a fourth plurality of data clusters associated with the second classification;

identifying a third cross-classification cluster matchup, wherein the third cross-classification cluster matchup comprises a first data cluster of the third plurality of data clusters and a second data cluster of the fourth plurality of data clusters;

identifying a fourth cross-classification cluster matchup, wherein the fourth cross-classification cluster matchup comprises a third data cluster of the third plurality of data clusters and a fourth data cluster of the fourth plurality of data clusters; and determining a third SVM for the third cross-classification cluster matchup and a fourth SVM for the fourth cross-classification cluster matchup, wherein the third SVM and the fourth SVM are determined at least partially in parallel.

11. The system of claim 10, wherein the first SVM, the second SVM, the third SVM, and the fourth SVM are each determined at least partially in parallel.

12. The system of claim 10, wherein the SVM ensemble comprises a plurality of ensemble members including the first ensemble member and the second ensemble member, and wherein the at least one processor is further configured to execute the computer-executable instructions to:
   determine a first class confusion matrix for the first ensemble member;
   determine a second class confusion matrix for the second ensemble member; and
   determine an overall class confusion matrix for the SVM ensemble based at least in part on a set of classification results determined by the SVM ensemble for the training dataset, wherein each classification result is a classification determined by a threshold number of the plurality of ensemble members for a respective observation in the training dataset.

13. The system of claim 12, wherein the at least one processor is further configured to execute the computer-executable instructions to:
   determine, based at least in part on the first class confusion matrix and the second class confusion matrix, that a first classification error associated with the first ensemble member is greater than a second classification error associated with the second ensemble member;
   assign a first weight to the first ensemble member based at least in part on the first class confusion matrix; and
   assign a second weight to the second ensemble member based at least in part on the second class confusion matrix,
   wherein the first weight is less than the second weight.

14. The system of claim 8, wherein the at least one processor is further configured to perform the build of the ensemble member by executing the computer-executable instructions to:
   filter the first cross-classification cluster matchup to remove a first one or more row vectors that are not candidates for use as a support vector for the first SVM; and
   filter the second cross-classification cluster matchup to remove a second one or more row vectors that are not candidates for use as a support vector for the second SVM,
   wherein the first cross-classification cluster matchup and the second cross-classification cluster matchup are filtered at least partially in parallel.

15. A computer program product for constructing a Support Vector Machine (SVM) ensemble, the computer program product comprising a non-transitory storage medium readable by a processing circuit, the storage medium storing instructions executable by the processing circuit to cause a method to be performed, the method comprising:
   determining a subset of data in a training dataset to allocate to an ensemble member of the SVM ensemble; and
   building the ensemble member, wherein building the ensemble member comprises:
      partitioning a first portion of the subset of data into a first classification and a second portion of the subset of data into a second classification;
      determining a first plurality of data clusters among the first portion of the subset of data partitioned into the first classification and a second plurality of data clusters among the second portion of the subset of data partitioned into the second classification;
      identifying a first cross-classification cluster matchup, wherein the first cross-classification cluster matchup comprises a first data cluster of the first plurality of data clusters and a second data cluster of the second plurality of data clusters;
      identifying a second cross-classification cluster matchup, wherein the second cross-classification cluster matchup comprises a third data cluster of the first plurality of data clusters and a fourth data cluster of the second plurality of data clusters; and
      determining a first SVM for the first cross-classification cluster matchup and a second SVM for the second cross-classification cluster matchup,
      wherein the first SVM and the second SVM are determined at least partially in parallel.

16. The computer program product of claim 15, wherein the training dataset is a first dataset, and wherein building the ensemble member further comprises:
   constructing a directed acyclic graph (DAG) using the first SVM and the second SVM,
   the method further comprising:
      classifying, by the ensemble member, a row vector of a second dataset in one of the first classification or the second classification using the DAG.

17. The computer program product of claim 15, wherein the ensemble member is a first ensemble member and the subset of data in the training dataset is a first subset of data, the method further comprising:
   determining a second subset of data in the training dataset to allocate to a second ensemble member of the SVM ensemble; and
   building the second ensemble member, wherein building the second ensemble member comprises:
      partitioning a first portion of the second subset of data into the first classification and a second portion of the second subset of data into the second classification;
      determining a third plurality of data clusters among the first portion of the second subset of data partitioned into the first classification and a fourth plurality of data clusters among the second portion of the second subset of data partitioned into the second classification;
      identifying a third cross-classification cluster matchup, wherein the third cross-classification cluster matchup comprises a first data cluster of the third plurality of data clusters and a second data cluster of the fourth plurality of data clusters;
      identifying a fourth cross-classification cluster matchup, wherein the fourth cross-classification cluster matchup comprises a third data cluster of the third plurality of data clusters and a fourth data cluster of the fourth plurality of data clusters; and
      determining a third SVM for the third cross-classification cluster matchup and a fourth SVM for the fourth cross-classification cluster matchup,
      wherein the third SVM and the fourth SVM are determined at least partially in parallel.

18. The computer program product of claim 17, wherein the first SVM, the second SVM, the third SVM, and the fourth SVM are each determined at least partially in parallel.

19. The computer program product of claim 17, wherein the SVM ensemble comprises a plurality of ensemble members including the first ensemble member and the second ensemble member, the method further comprising:

determining a first class confusion matrix for the first ensemble member;

determining a second class confusion matrix for the second ensemble member; and determining an overall class confusion matrix for the SVM ensemble based at least in part on a set of classification results determined by the SVM ensemble for the training dataset, wherein each classification result is a classification determined by a threshold number of the plurality of ensemble members for a respective observation in the training dataset.

20. The computer program product of claim 19, further comprising:

determining, based at least in part on the first class confusion matrix and the second class confusion matrix, that a first classification error associated with the first ensemble member is greater than a second classification error associated with the second ensemble member;

assigning a first weight to the first ensemble member based at least in part on the first class confusion matrix; and assigning a second weight to the second ensemble member based at least in part on the second class confusion matrix, wherein the first weight is less than the second weight.

* * * * *